(12) United States Patent
Yau et al.

(10) Patent No.: US 8,359,637 B2
(45) Date of Patent: Jan. 22, 2013

(54) SYSTEM AND METHOD FOR ACCESS CONTROL OF NETWORK DEVICES ACROSS MULTI-PLATFORM ACCESS LISTS

(75) Inventors: Herman Yau, Palo Alto, CA (US); Song Yao, Union City, CA (US); Bin U, Fremont, CA (US)

(73) Assignee: Seedonk, Inc., Fremont, CA (US)

( * ) Notice: Subject to any disclaimer, the term of this patent is extended or adjusted under 35 U.S.C. 154(b) by 426 days.

(21) Appl. No.: 12/580,636

(22) Filed: Oct. 16, 2009

(65) Prior Publication Data
US 2011/0093923 A1    Apr. 21, 2011

(51) Int. Cl.
*G06F 7/04* (2006.01)
(52) U.S. Cl. .......................................... 726/4; 713/168
(58) Field of Classification Search .................. 726/2, 3, 726/4; 707/E17.032; 713/168
See application file for complete search history.

(56) References Cited

U.S. PATENT DOCUMENTS

| 7,467,212 | B2 * | 12/2008 | Adams et al. | 709/229 |
|---|---|---|---|---|
| 7,620,902 | B2 * | 11/2009 | Manion et al. | 715/758 |
| 2007/0214264 | A1 * | 9/2007 | Koister | 709/225 |
| 2008/0134235 | A1 * | 6/2008 | Kalaboukis | 725/32 |
| 2009/0259971 | A1 * | 10/2009 | Rankine et al. | 715/810 |
| 2009/0292814 | A1 * | 11/2009 | Ting et al. | 709/229 |
| 2010/0094703 | A1 * | 4/2010 | Bramley et al. | 705/14.45 |
| 2010/0125511 | A1 * | 5/2010 | Jouret et al. | 705/27 |

* cited by examiner

*Primary Examiner* — Samson Lemma
(74) *Attorney, Agent, or Firm* — James Cai; Schein & Cai LLP

(57) ABSTRACT

A system for sharing a device between two independent software platforms and for access control of a network device across the two independent software platforms is provided. The system has a first computing device operating on a first software platform for authenticating at least a first user and accessing a first user's access list having at least one address of a second user. The system also has a second computing device operable with the same first user and a second different software platform. A destination across the first and the second software platforms is mapped to selectively control the device by the second user from the first user's access list with the second user operating on the second computing device.

3 Claims, 15 Drawing Sheets

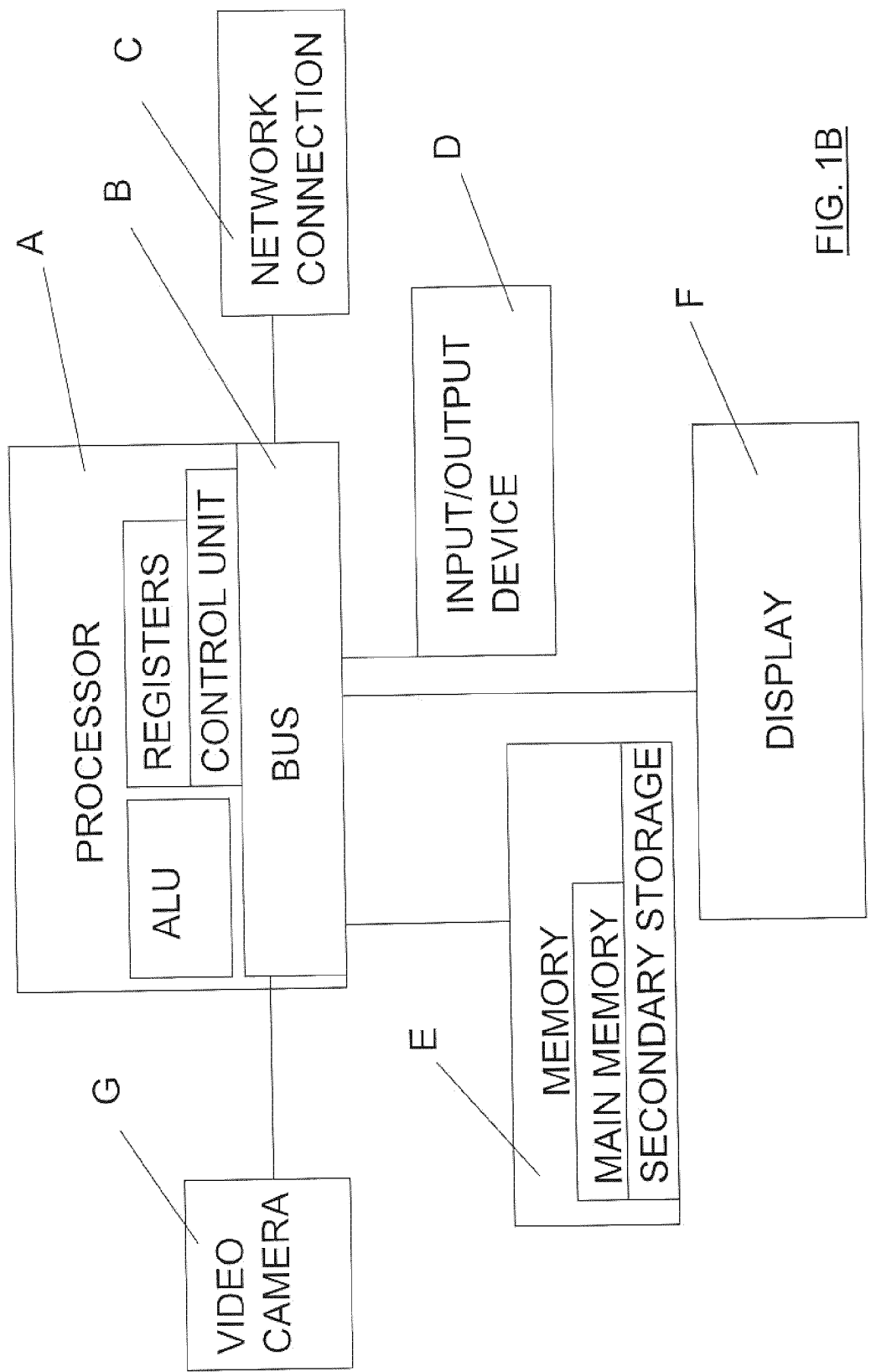

SYSTEM AND METHOD FOR ACCESS CONTROL OF NETWORK DEVICES ACROSS MULTI-PLATFORM ACCESS LISTS

FIELD OF THE INVENTION

The present disclosure is directed to a system for cross platform authentication, authorization and device access control. More particularly, the present disclosure is directed to a first and a second independent software platform where a user can share a network device, such as a digital video camera, between the first and second independent software platforms.

BACKGROUND OF THE RELATED ART

Social networks are known in the art. These software platforms are very advantageous for communicating and sharing information between vast numbers of users. Once a user accesses the social network, a listing of friends is provided whereby a user can communicate with a number of friends on the access list. Users would desire however to effectively share many devices with friends on a social network. However, if a user accesses multiple different software platforms with each different independent software platform having a number of access lists, sharing devices can be difficult, due to the inoperability between different social networks.

There are technological solutions that attempt to map user login information across multiple platforms; however this solution merely provides accessing multiple platforms at the same time in a secure manner and not sharing devices in a secure manner over multiple different social platforms. The prior art does not allow a user to gain access of a user's network devices along multiple platforms in a convenient, secure and easy manner.

SUMMARY OF THE INVENTION

According to a first aspect of the present disclosure, there is provided a system for sharing a device. The system has a first computing device operating on a first software platform. The system is for authenticating at least a first user and accessing a first user's access list having at least one address of a second user. The system also has a second computing device operable with the first user and a second different software platform. A destination across the first and the second software platforms is mapped to selectively control the device associated with the first user from the first user's access list with the second user operating on the second computing device.

In yet another aspect of the present disclosure there is provided a system for sharing a network device between users using at least two different software platforms. The system has a first communication device communicatively coupled to a communication network and a first software platform operable on the first communication device or operable on the communication network.

The system also has a second communication device communicatively coupled to the communication network. A second software platform is operable on the second communication device or operable on the communication network. The first software platform comprises a first authentication program and a first access list. The first software program includes program instructions to select the network device desired to be shared.

The second software platform has a second authentication program and a second access list. The first software platform accesses the first access list to select an address associated with the second communication device. The first software platform communicates an output of the network device to users associated with the first or the second access lists associated with the first or the second software platforms.

In another embodiment of the present disclosure, there is provided a method of controlling a network device operable on a first software platform from a second software platform using an access list associated with the first or the second software platform. The method accesses the first software platform having a first access list and authenticates a first user using the first software platform. The method maps a path of at least a second user using the first access list in the first software platform. The second user accesses the second software platform and authenticates the second user.

The method provides an output of the network device to the second user using at least one of, or both of, the second software platform and the first software platform. The method manages the network device by controlling the network device with the first or the second software platform.

According to yet another embodiment of the present disclosure there is provided a recordable computer medium that comprises program instructions for authenticating at least a first user and accessing a first user's access list having at least one address of a second user. The recordable computer medium further comprises program instructions for mapping a destination across a first and a second software platform to selectively control or access a device by the second user from the first user's access list with the second user operating on a second computing device.

According to yet another embodiment of the present disclosure there is provided a system for sharing a device. The system includes a first computing device operating on a first software platform for authenticating at least a first user and accessing a first user's access list having at least one address of a second user. The system also has a second computing device operable with the first user and a second different software platform and a third computing device operable with the first user and a third different software platform. The system maps a destination across the first, the second and the third software platforms to selectively control the device associated with the first user from the first user's access list with the first user operating on the third computing device.

BRIEF DESCRIPTION OF THE FIGURES

The foregoing and other objects, features and advantages of the invention will be apparent from the following more particular description of preferred embodiments of the invention, as illustrated in the accompanying drawings in which like reference characters refer to the same parts throughout different views. The drawings are not meant to limit the invention to particular mechanisms for carrying out the invention in practice, but rather, are illustrative of certain ways of performing the invention. Others will be readily apparent to those skilled in the art.

FIG. 1B shows a general purpose computer operatively connected to a video camera as the network device;

DETAILED DESCRIPTION OF THE PREFERRED EMBODIMENTS

Figure 1A:
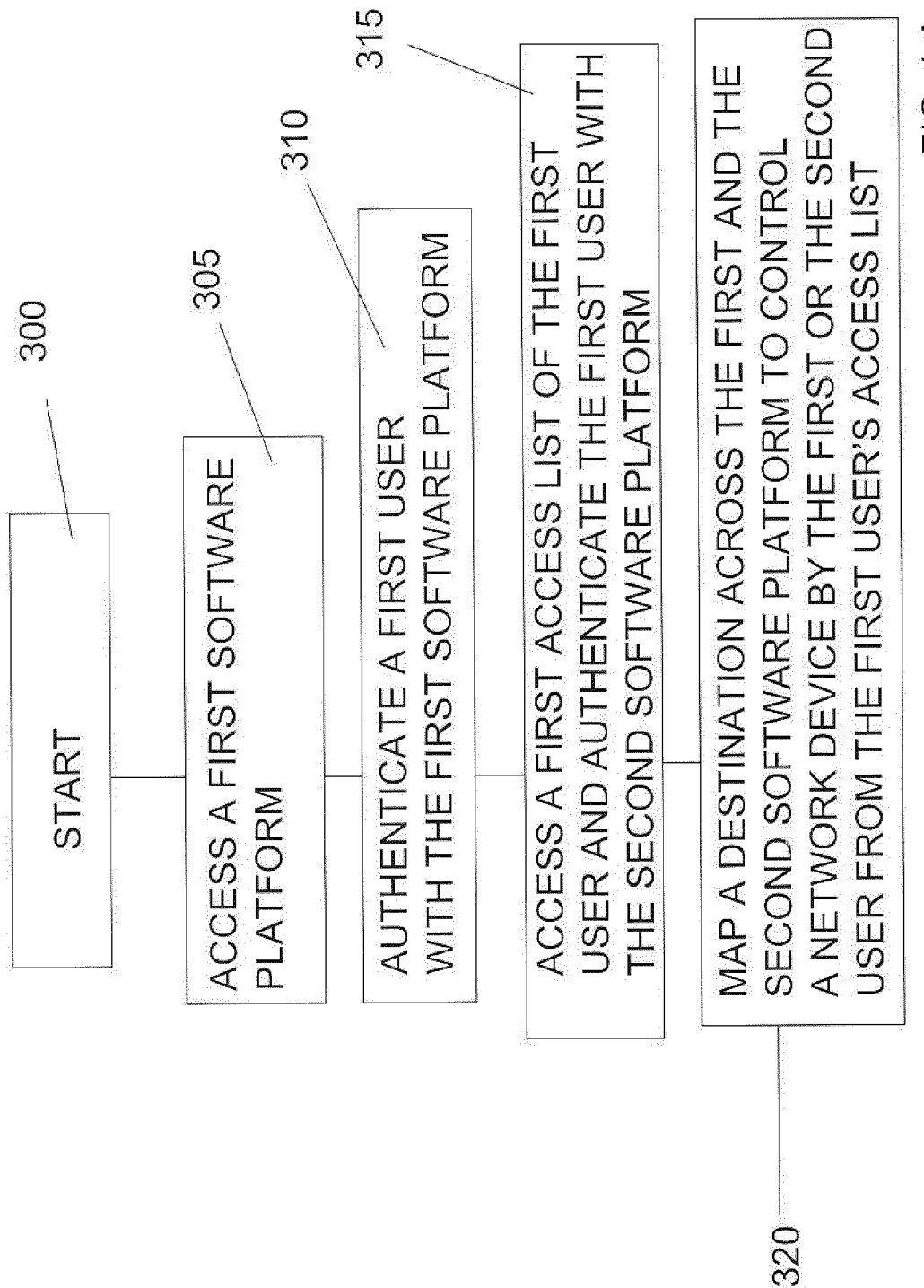
FIG. 1A shows a method according to the present disclosure.

The present disclosure preferably is operable for use with a first software platform and a second software platform, which can be independent or alternatively, which can be related. Turning to FIG. 1A, there is shown a method of the present disclosure. The method starts at step 300 and a user can access a first software platform and can be authenticated at steps 305 and 310. The method preferably accesses in an automatic manner at least one access list stored on the first and the second software platform (step 315). The access list is associated with a user account or multiple user accounts and can include an e-mail address, a screen name, a user name, a FACEBOOK® identity, an AOL AIM® screen name, a social network screen name or any other identity for a network connection, online services or social network. Using the access list, it is determined which users are authorized to access and control the network device from the at least one access list.

Once authenticated and authorized (steps 305 and steps 310) on all of the associated software platforms, user A using either the first or the second or other software platforms can control at least one network device that is associated with the first software platform. Furthermore, user A can even control the network devices associated with all other software platforms from the first software platform in an independent manner (step 320) depending on the interface rule settings by the other associated software platforms. Turning now to FIG. 1B, there is shown a general purpose computer to be used with certain aspects of the system and method of the present disclosure. The network device G can be any device connected to, or associated with a computer or communication device operable with a software program. In one preferred embodiment, the network device G can be an internet appliance, a network camera, a video camera, a digital video recorder, a memory, a computing device or any other device known in the art.

The network device G, for example, can be a simple web camera or an internet camera. The internet camera can be operable with either an MJPEG or MPEG4 or other encoded format. The internet camera also preferably uses an Internet Protocol to transmit image data and control signals over a fast Ethernet link. The Internet Protocol camera can be those suitable for deployment together with a digital video recorder (DVR) or a network video recorder (NVR) to form a video surveillance system.

Referring again to FIG. 1B, the present disclosure may be implemented on a computer system. The computer system preferably includes the generic components of most general purpose computers. The computer system comprises an interconnection mechanism such as a bus B or circuitry which couples an input device D such as a keyboard. The system also has a processor A (such as a microprocessor having an arithmetic logic unit, a register and a control unit). The computer also includes a storage device or memory E (such as a computer disk for a main memory and secondary storage) and an output device such as a monitor or screen F. The computer also has a network connection C for connecting to the Internet. Various embodiments of the invention will be described in conjunction with the components of computer systems. A typical example of a computer system is an IBM® Personal Computer, an APPLE® MAC® computer, or a compatible computer.

Figure 1C:
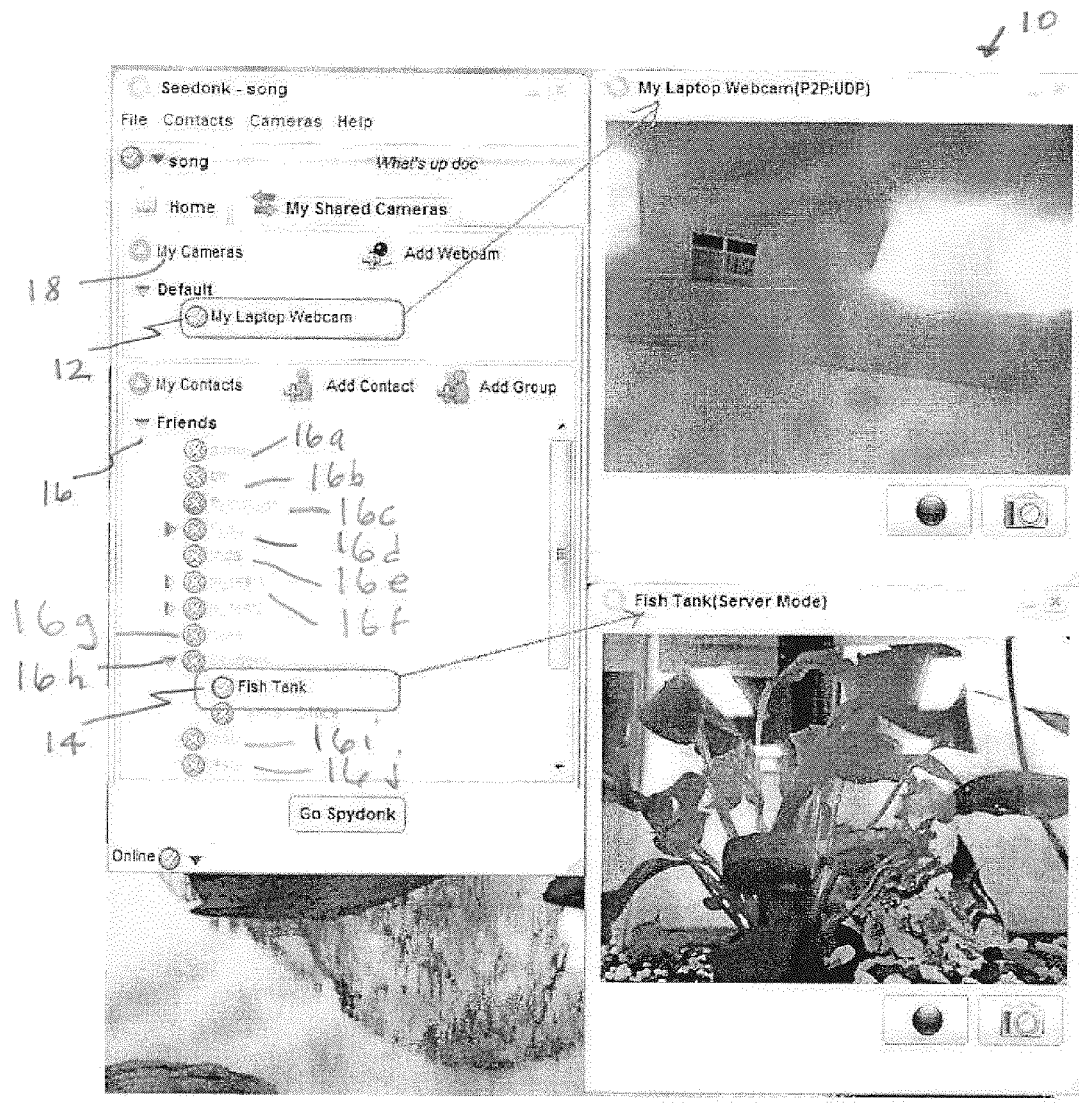
FIG. 1C shows a screen shot of a first user controlling a network device within a first software platform.

Turning now to FIG. 1C, there is shown a first software platform 10. The first software platform 10 is preferably a SEEDONK® INSTANT MESSAGING PLATFORM. The first software platform 10 is preferably a video monitoring and a video sharing application and is a consumer platform for viewing, managing and sharing cameras over the Internet. The first software platform 10 is operable on a personal computer, a mobile communication device, a network appliance, or is operable on a server. The computer running the first software platform may be a cloud computing configuration or may include a memory E, a processor A, a bus B, a display F, a user interface D and an internet connection C as shown in FIG. 1B.

The first software platform 10 preferably is connected to a first network camera 12, and a second network camera 14. The first software platform 10 may be operable on the operating system of the computer or operable on a mobile communication device such as the I-PHONE® from APPLE® computers, which is connected to a communication network. The output of the first and the second network cameras 12, 14 is output to the display 10 as shown in FIG. 1C as digital video images. Alternatively, the network devices 12, 14 can be a digital video recorder, a broadcast television device, or any other appliance known in the art. Various configurations are possible and within the scope of the present disclosure.

The first software platform 10 also includes a first access list 16. The access list 16 preferably includes one or more individuals 16a through 16j having a communication address as represented by icons. Preferably, any number of individuals 16a through 16j can be stored in the access list 16 with one or several communication addresses associated with each individual. The address can be an e-mail address, a social network address, an instant messenger address, a mobile device address, a SKYPE® address, or any other suitable identification that is known in the art and that depends on the first software platform 10.

The first software platform 10 also further includes that the network appliance or device 12, 14 is associated with at least one individual 16h, 18 on the first access list 16 or associated with the first user as shown. Therefore, a first user or a member 16h of the access list 16 includes an icon below that user to graphically associate the individual with the particular network device 12, 14.

Figure 2:
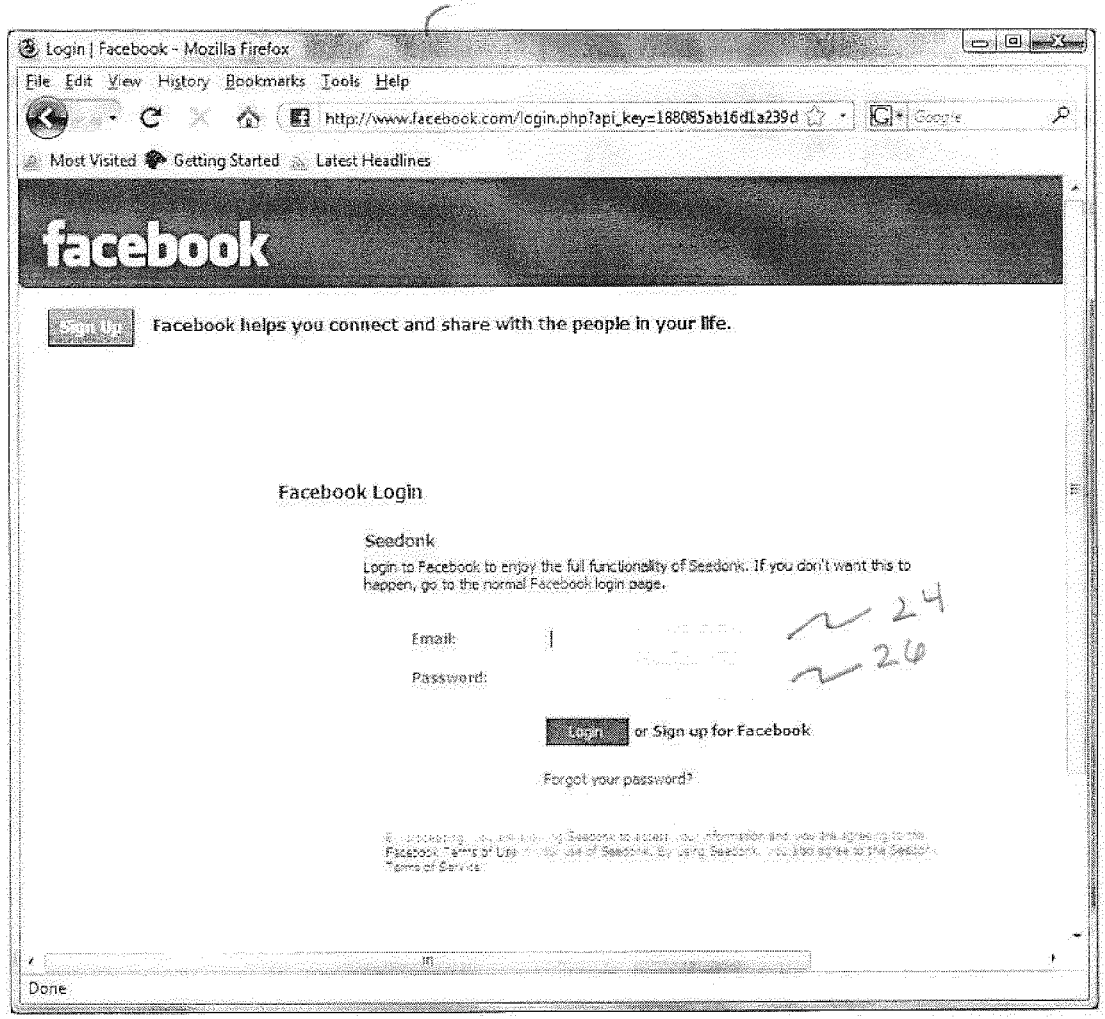
FIG. 2 shows a screen shot of an account authorization within a second software platform.

Turning now to FIG. 2, there is shown a second software platform 20, which is a social networking software program, such as, for example, FACEBOOK®, MYSPACE®, FRIENDSTER®, GAIA ONLINE®, ORKUT®, PICZO®, YAHOO!®, 360® or the like operable on a browser 22, such as MOZILLA FIREFOX®, GOOGLE CHROME®, MICROSOFT WINDOWS INTERNET EXPLORER®, OPERA®, APPLE SAFARI® or the like. User A may login to the second software platform 20 using a social network identity, screen name, or an e-mail address 24 and password 26 from the browser 22 or alternatively using an interface 30 (FIG. 3) between the first software platform 10 of FIG. 1C and the second software platform 20 of FIG. 2. The interface 30 preferably allows the first software platform 10 and the second software platform 20 to communicate with one another and can be installed on the first software platform 10 or can be installed on the second software platform 20 or can be installed from a different software platform.

Figure 3:
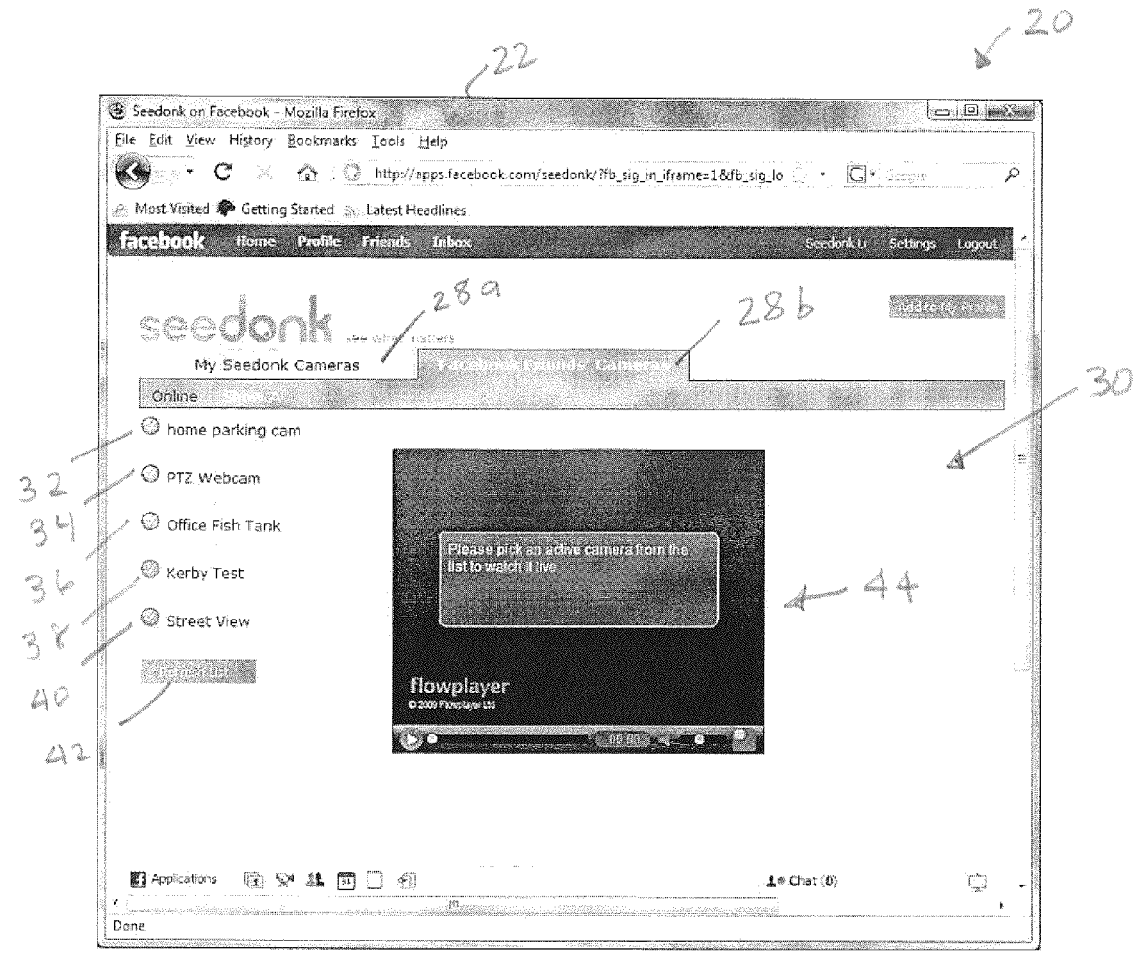
FIG. 3 shows a screen shot of an interface within the second software platform of FIG. 2 showing the first software platform network devices of FIG. 1 and showing a number of network devices which are shared to user A and owned by other users.

Turning now to FIG. 3, there is shown an interface 30 for listing the network device(s) 32 through 40 of the first software platform 10 which are shared to user A and also owned by other users of the second software platform 20. The network device(s) 32-40 can be cameras accessed from the first software platform 10 of FIG. 1C or can be network devices 32-40 shared from other users on the second software platform 20 or alternatively from a third independent software platform (not shown). The network devices 32-40 can be shared or can be independent of the first and the software platforms 10 and 20. As can be seen from FIG. 3, there is shown a graphical interface 20 which shows the output 44 of a network device output into a tabbed interface 28b located in the second software platform 20. The network device list on the first software platform 10 is graphically displayed in a first tab 28a.

Figure 4:
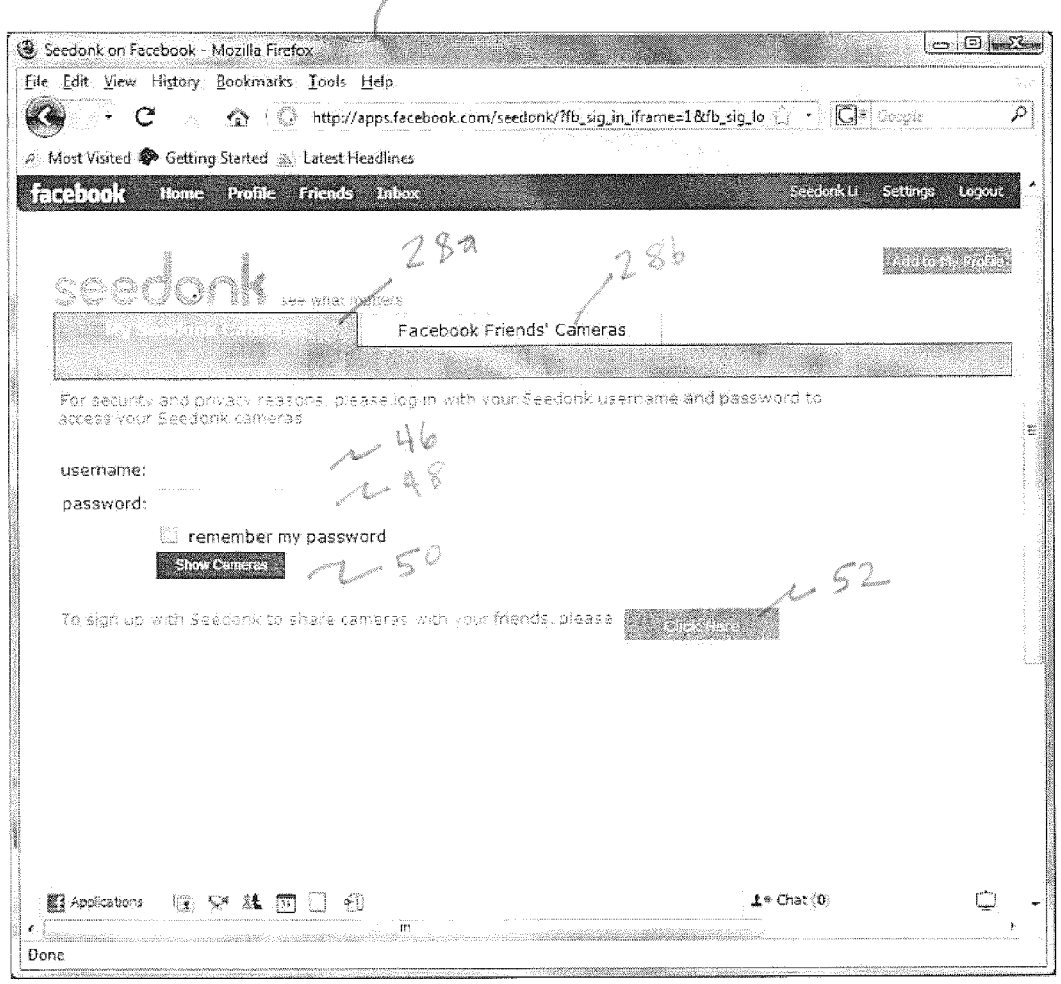
FIG. 4 shows a screen shot of the second software platform and an account authentication of the first user associated with the first software platform.

Turning now to FIG. 4, within the second software platform session 20, user A can select tab 28a and access the first software platform 10. The first tab 28a shown in FIG. 4 displays a username login and a password login prompt to authenticate user A so user A can access the first software platform 10 and the network devices associated with the first software platform 10. That is user A (when alternatively logging in from the second software platform 20) will be prompted to provide a login username 46 and a password 48 to access the first software platform 10 and to access and control the first and the second network devices 12, 14 as shown in FIG. 1.

Figure 5:
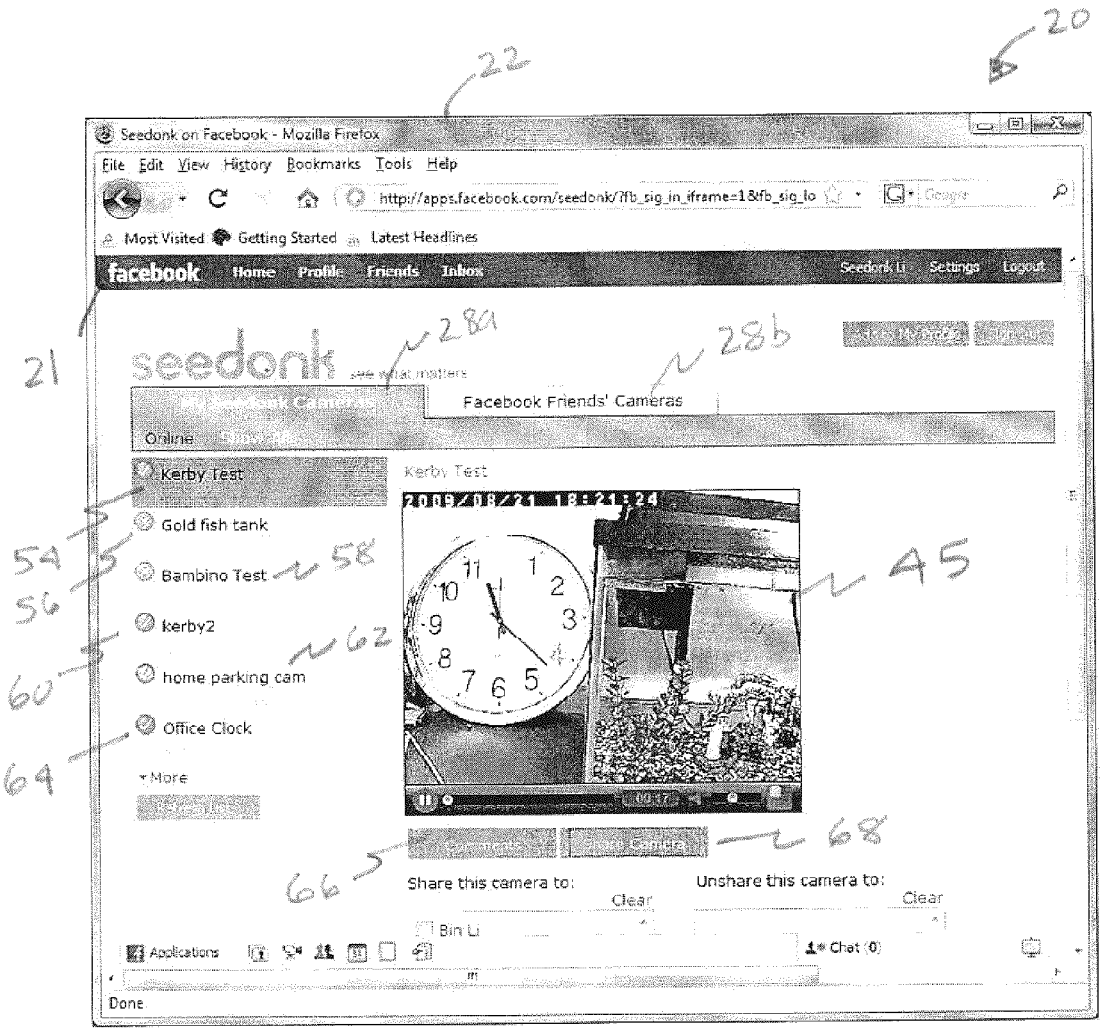
FIG. 5 shows a screen shot of a second software platform with a number of cameras associated with the first software platform and a share and unshared module of a number of users associated with an access list.

FIG. 5 shows the display of the first software platform 10 within the second software platform 20. The second software platform 20 includes a menu bar 21 displaying one or more functions of the second software platform (social network) 20 as is known in the art.

Displayed in the second software platform 20 is the first software platform display 10. The second software platform 20 has one or more network devices 54, 56, 58, 60, 62 and 64 that are operable with the first and the second software platform 10 and 20. The second software platform 20 also includes multiple tabs 28a and 28b that allow user A to switch between the network devices 54, 56, 58, 60, 62 and 64 and 32-40 shown in FIG. 3 associated with the first or the second software platforms 10, 20. For example, the first tab 28a can be associated with the first software platform 10 and network devices 54, 56, 58, 60, 62 and 64. These include the first through fifth network devices 54, 56, 58, 60, 62 and 64. These network devices 54, 56, 58, 60, 62 and 64 can be any suitable appliances known in the art and can be an internet camera, a pan tilt zoom camera, a web camera, a wide field of view camera, and any other device associated with the capture of still or video images or recording and displaying of video images.

The second software platform 20 may also selectively allow the user A to remove or add new or existing devices 52 shown on FIG. 4 or may allow the user A to refresh the list to show new devices as shown as reference numeral 42 on FIG. 3. The second software platform 20 may also selectively allow the user A to add or remove certain devices and also includes a display screen to permit the user A to view the output of the internet camera 44, 45 as desired.

Figure 6:
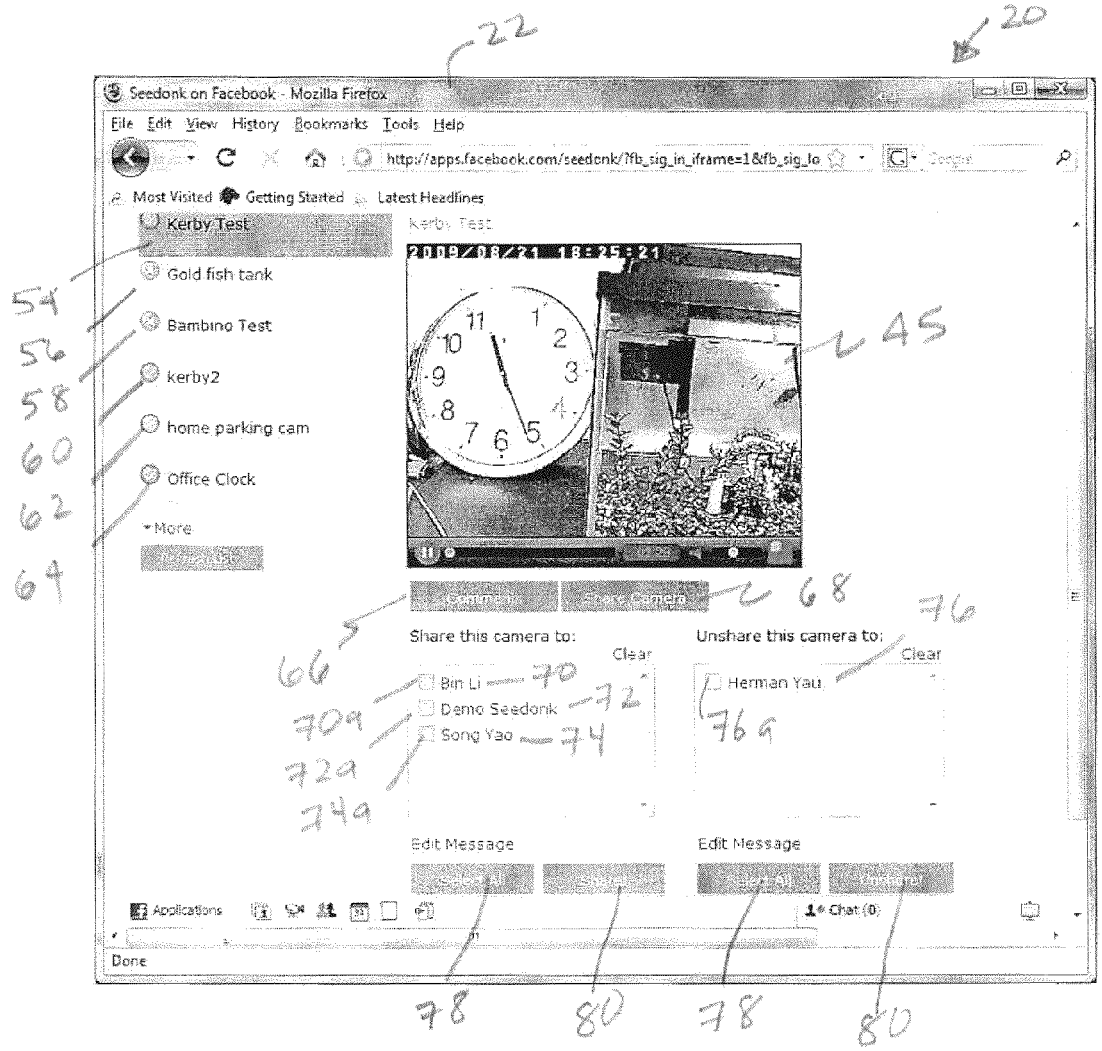
FIG. 6 shows a close up of the module of FIG. 5.

FIG. 5 shows a video output of the first software platform 10 operating within the second software platform 20 and displaying a video image 45 associated with network device 54 of the first software platform 10. Turning now to FIG. 6, there is shown a first tab 28a including a display screen 45 associated with the first network device 54 of the first software platform 10 that is desired to be shared with a second user 70, a third user 72 and a fourth user 74. The first network device 54 is highlighted to provide an indication that user A is viewing the display 45 of the first network device or camera 54.

Advantageously, user A can use the access list 16 of FIG. 1C on the first software platform 10 or the access list associated with the second software platform 20 to map a path to the users 70, 72, 74 and 76 associated with either the first or the second software platform 10, 20 to permit the desired user to view the output 45 of the network device 54 or any other network device 56-64. The first software platform 10 preferably includes a list of network devices (cameras) 54-64 and a list of users 70, 72, 74 and 76 that can share control and output of the network devices 54-64. The users 70, 72, 74 and 76 can include an indicator icon 70a, 72a, 74a and 76a indicating whether that user in the access list 16 can view and control the network device 54 or is restricted from viewing and controlling the network device 54. Additionally, the users 70, 72, 74 and 76 can be placed in a shared list or an unshared list as shown.

For example, the first software platform 10 includes user A operating the computer as shown in the screen shot of FIG. 6, a second user 70, and a third user 72 and as many other users that are as located on either the access list of the first or the second software platform 10, 20. User A can indicate by clicking or toggling on icons 70a, 72a, and/or 74a whether to permit access by the respective user to the network device 54 or may select or click on a second icon 76a to deny or restrict access to the user 76 of the network device 54. However, the list of users is generated in an automatic manner regardless and independent of the particular software platform 10, 20 and a destination of the output of the network device 54 is mapped to the desired user once an authentication is made. Additionally, user A can leave textual comments or messages 66 and share messages with the second user 70 (or any other desired user).

Figure 7:
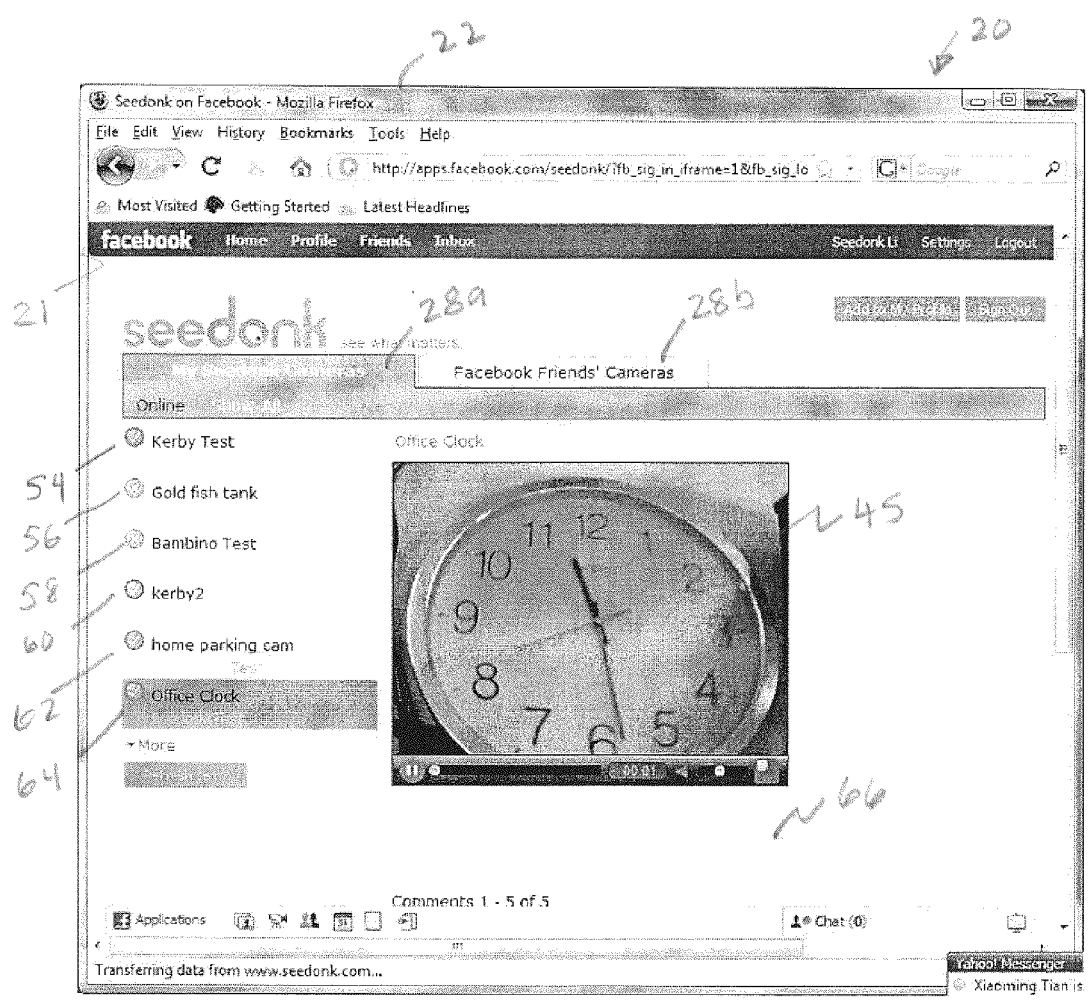
FIG. 7 shows a screen shot of a first user managing a camera video display of one of the network devices.

As can be seen in FIG. 7, there is shown user A within the second software platform 20 controlling a video display of the sixth network device (camera) 64 within the second software platform 20.

Figure 8:
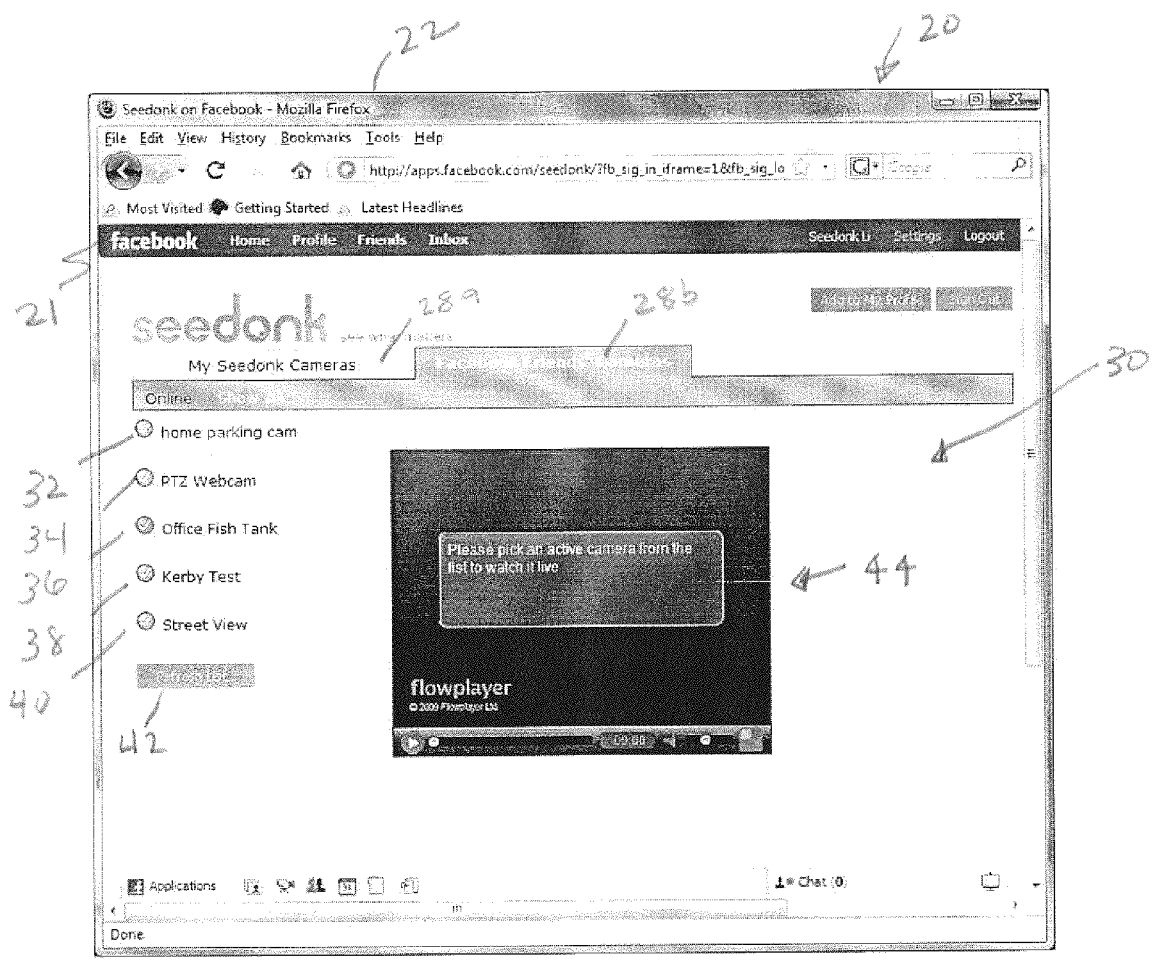
FIG. 8 shows a second user sharing a network device to user A.
Figure 9:
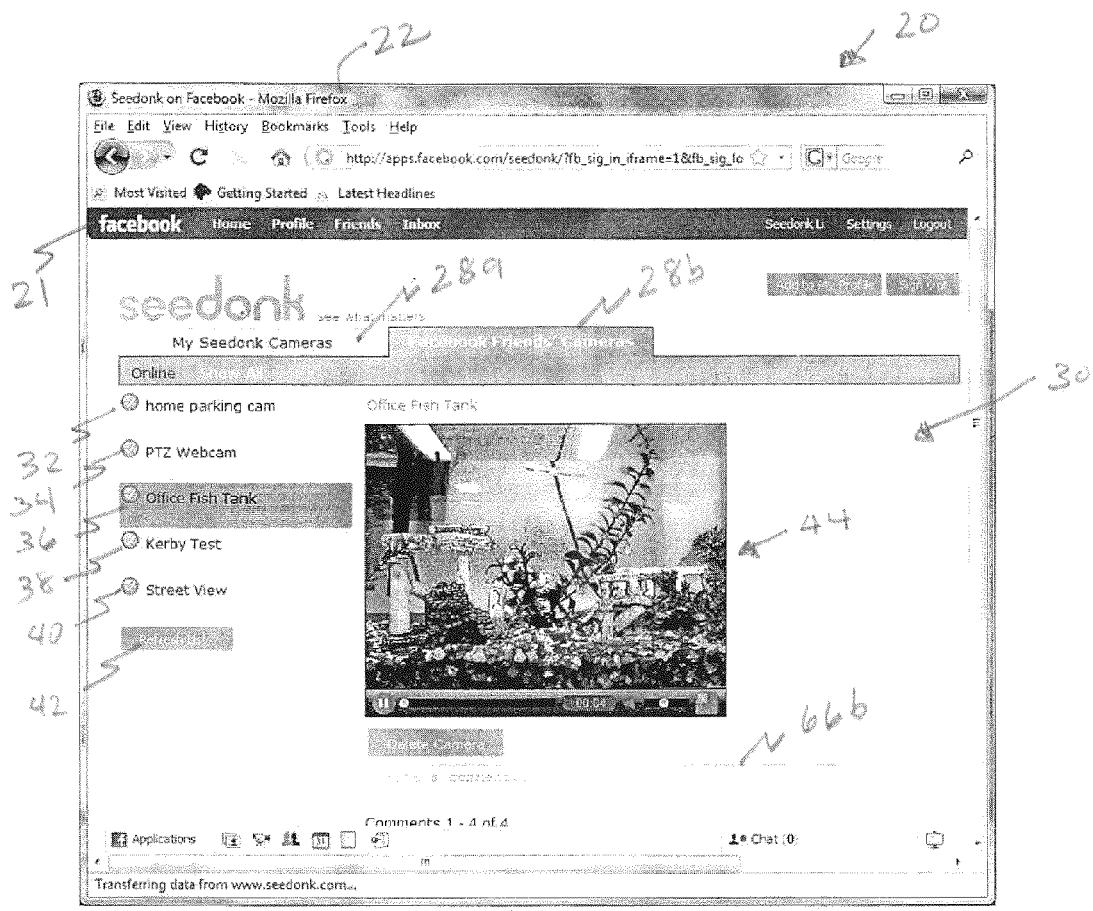
FIG. 9 shows a screen shot within the second user's session in the second software platform and a list of network devices associated with the second software platform.

Turning now to FIG. 8, after clicking tab 28b, platform 30 shows some network devices 32-40 shared to user A and that are owned by other users associated with the second platform session. FIG. 9 shows a screen shot that displays the video image from shared network devices shared to user A and owned by a fourth user 74 in FIG. 6. FIG. 9 shows a video display of network device 36 shown as a video display 44, which can be viewed by user A and the fourth user 74. User A may leave a comment 66*b* for the fourth user 74 by sharing the comment or can chat with the fourth user 74. Notably, this authentication and sharing occurs across independent multiple software platforms.

Figure 10:
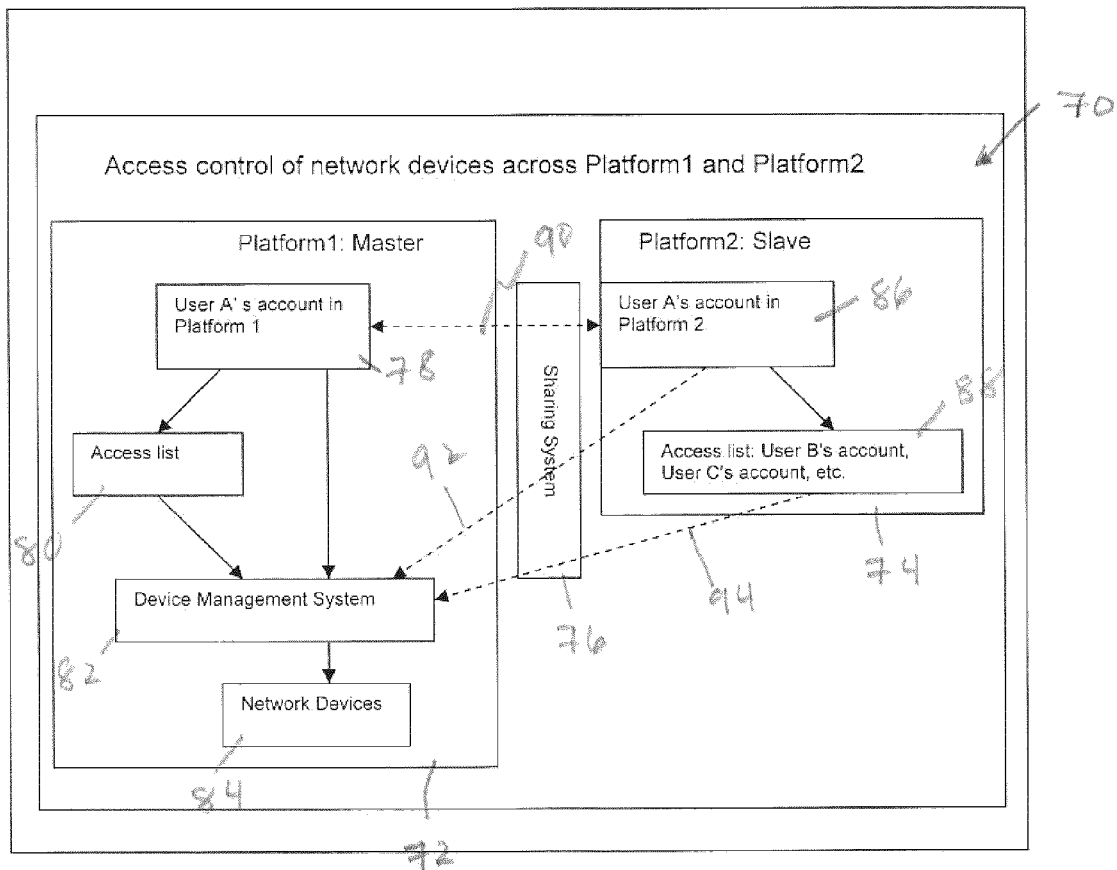
FIG. 10 shows a logic diagram of an access control of network devices along at least two software platforms with a sharing system.

Turning now to FIG. 10, there is shown a logic diagram for the system 70 according to the present disclosure. The system 70 is shown by reference numeral 70 and merely shows one non-limiting embodiment of the present disclosure as various different logic diagrams are envisioned and can be used within the scope of the present disclosure. The system 70 includes a first platform 72, which acts as a primary or master platform and a second platform 74, which acts as a secondary or slave platform.

It should be appreciated that the second software platform 74 may act alternatively as the master or primary platform while first software platform 72 may act as the slave or secondary platform. It should also be appreciated that alternatively the first or the second software platform 72, 74 may act as a master or slave for another different third independent software platform. Various configurations are possible within the scope of the present disclosure.

The system 70 includes a sharing system 76 that links the first and the second software platforms 72 and 74 for communication purposes. Preferably, sharing system 76 links to secondary system 74 by an application programming interface, however, this arrangement is not limiting any the link may take other forms. For example, the application programming interface of system 74 can be language-dependent; that is, available only in a given programming language, using the syntax and elements of that language to make the API convenient to use in this context or can be language-independent. Language-independent is written in a way that means it can be called from several programming languages (typically an assembly or C interface). This is an advantageous feature for a service-style API that is not bound to a given process or system and is available as a remote procedure call.

The first software platform 72 includes an account 78, an access list 80, a device management system 82 and a network device 84. The second software platform 74 includes an account in the second software platform shown as reference numeral 86 and an access list 88. The access list 88 includes several different user accounts, for example, a second and a third user's accounts. Sharing system 76 advantageously links the second or slave software platform 74 with the master software platform 72. Sharing system 76 then links or maps the access control between the first and the second software platforms 72, 74. Sharing system 76 generates a first link 90 between the user accounts of user A in the first software platform 78 and user A's account in the second software platform 86. Sharing system 76 also provides a second link 92 between user A's account in the second software platform 86 and the device management system 82. Sharing system 76 further provides a third link 94 between the access list of other users on the second software platform 88 and the device management system 82 of the first software platform 72. This allows user A and other designated shared users on the second software platform 74 to potentially access the network device 84 on the first software platform 72. It should be appreciated that a second and a third sharing system (not shown) can be provided to link to additional software platforms. Additional links between the platforms 72, 74 and the sharing system 76 may be possible and is within the scope of the present disclosure.

Figure 11:
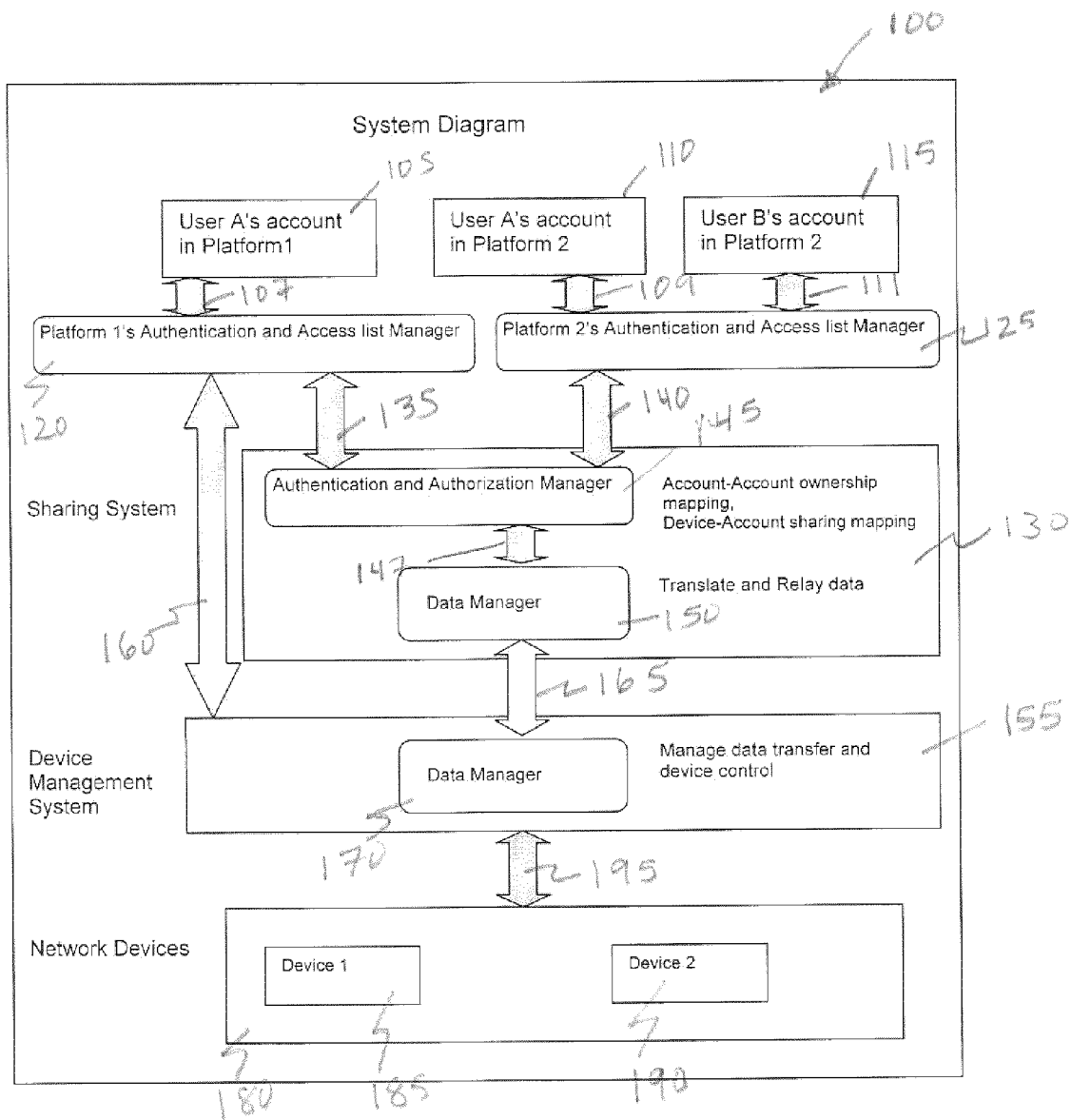
FIG. 11 shows a system diagram of the first and second software platforms with the first and the second user, a sharing system, a device management system and a first and a second network devices.

Turning now to FIG. 11, there is shown a view of the system 70 of FIG. 10 in more detail. The system 100 includes user A's account in the first software platform shown as reference number 105, user A's account in the second software platform 110 and a second user's (user B's) account in the second software platform 115 with each user accessing the respective software platform at a different location and using a different computing device along bidirectional communication paths 107, 109, and 111.

Alternatively, in a cloud computing configuration at least two software platforms may be stored on one computing device and the respective users can access the platforms via an Internet connection as is known in the art. The first software platform preferably has an authentication manager and an access list manager shown as reference numeral 120. The second software platform also has an authentication manager and an access list manager 125. The list of additional users that can access the network device 185, 190 and the user's addresses are preferably located in the access list and the access list managers 120, 125 to preferably allow access of this data for control of the network devices 185, 190.

In operation, preferably user A is defined as a user that has at least two accounts in two different software platforms. The access list is a list of accounts or contacts having at least one internet address, identity or screen name which can be granted access to the network device 185, 190 via the first and second software platforms. In one alternative embodiment of the present disclosure, user can have a network device owner account, which has unlimited access to the network device or can have a "non-owner" account. The non-owner account has limited access as defined by one or more rights to the network device 185, 190 that are assigned by at least one other entity.

The sharing system is shown by reference numeral 130 and preferably communicates with the first software platform's authentication and access list manager 120 and the second software platform's authentication and access list manager 125 along bidirectional paths 135 and 140. The sharing system 130 preferably includes an authentication and authorization manager 145 and a data manager 150.

The sharing system 130 also communicates with the device management system 155. The device management system 155 communicates with the first and the second software platforms along paths 160 and 165 via the sharing system 130 and to the first and the second software platform's authentication and access list managers 120 and 125.

Data manager 150 is connected to the authentication and authorization manager 145 along path 147. The data manager 150 communicates with the device management system 155, which includes a data manager 170. Data manager 170 manages data transfer and device control of the network device(s) 185, 190. The data manager 170 translates and relays data to and from the device management system 155 along path 165.

The sharing system 130 preferably allows at least one user to access and control a network device 185, 190 across multiple platforms via the access lists located in the access list manager 120, 125. The authentication and authorization manager 145 preferably acts as a bridge between multi-platforms 110, 115 and multiple access list managers 120, 125.

The authentication and authorization manager 145 validates account login information across multiple platforms 110, 115 to ensure that only authorized users are permitted access to the data output from the network devices 180. The authentication and authorization manager 145 also maps login account information across platforms and provides an account to account ownership mapping table. The table ensures the data output from the network devices 180 is output to the correct individual 105, 110, and 115. Authentication and authorization manager 145 also maintains a login session and lists devices 180. Authentication and authorization manager 145 also generates access information from devices 180 and identifies which are owned and non-owned devices. Authentication and authorization manager 145 also preferably lists the access lists for viewing by the user 105, 110, and 115 and manages sharing across the access lists across a mapping table.

The authentication and authorization manager 145 can share access lists from "share-to" accounts and "shared by accounts" from user A 105 to user A 110 and to other users 115. For example, user A 105 can share a device 185 to user A 110 and user B 115 on the second software platform, while users A and B 105, 110 and 115 can also share a device to a fourth user (not shown). Authentication and authorization manager 145 also can disable previous sharing and restrict an access of a network device's 180 when user A 105 or 110 no longer desires to share a network device 185 or 190 with another user.

The data manager 170 of the device management system 155 also communicates with the network devices 180, which are shown with a first network device 185 and a second network device 190 and preferably allows a user 105, 110, 115 to manage a network device 185, 190. Data manager 170 handles data transfer in the format of video, audio, image, text, or any other data (which can have various formats) that is output to the user from the network device 185, 190. Data manager 170 also preferably, uses the data in multiple independent platforms for control of the respective device 185, 190 and to manipulate the network device 185, 190 as desired, for example, to record, conduct a pan, tilt or zoom camera operation or the like.

The network devices 185, 190, preferably in one exemplary embodiment, are digital video cameras, or digital video recorders, however can be any other suitable network devices 185, 190 known in the art. The network devices 185, 190 preferably can be any hardware and software device that includes at least a processor, a memory and a network unit. The network device preferably is network capable and configured to connect to a Local Area Network through an Ethernet connection, a wireless network connection, an 802.11*b, g, n* wireless connection, a WiMAX® connection, or any other suitable wireless or wired network connection known in the art or in the future.

The network devices 180 are able to log in to the existing device account in the device management system 155 and should be able to take input commands from a remote client, perform the requested actions and then send back request data to the remote client along bidirectional path 195. The network devices 180 also preferably are suitable to run programs to communicate with other devices for remote data, remote device status and other control commands so the network devices 180 can preferably be controlled by a remote user. In an alternative embodiment, if the network devices 180 are not suitable for the above listed functions, a message can be output to the data manager 170, which is displayed to the user using a graphical interface.

Figure 12:
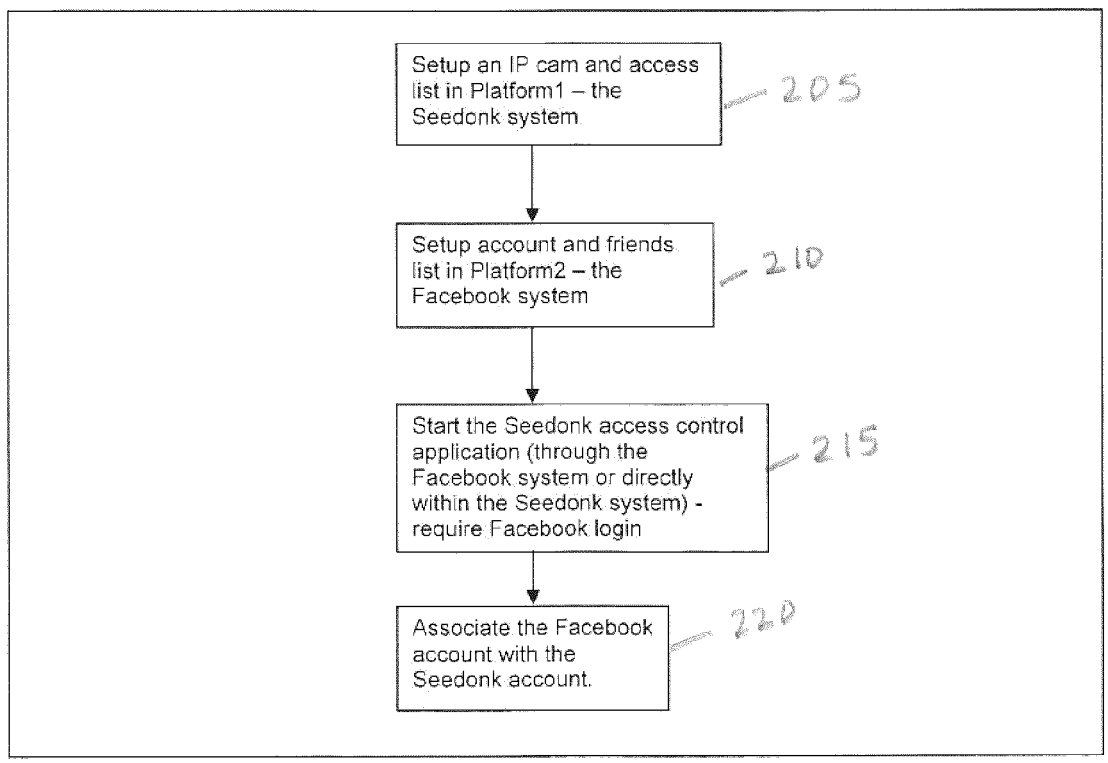
FIG. 12 shows a method of authenticating a first user in the first and the second software platforms.
Figure 13:
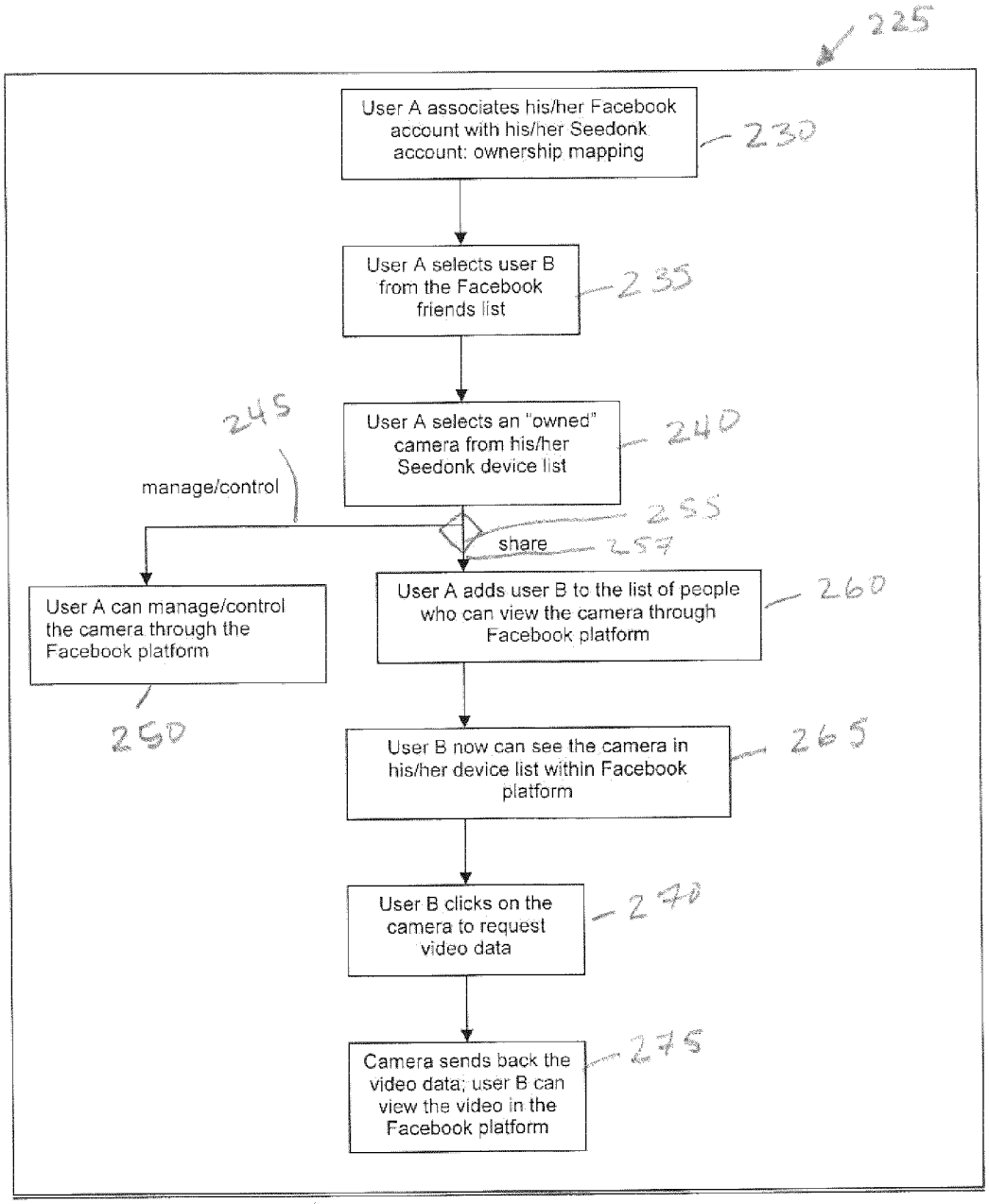
FIG. 13 shows a method of accessing and sharing a network device between at least two users between two independent software platforms.

Turning now to FIGS. 12 and 13, there is shown a method of a sample authentication flow and an access control of an internet protocol camera across multiple independent platforms shown as reference numeral 200 and 225. Turning first to FIG. 12, there is shown a number of method steps of authenticating and associating a user with a particular software platform.

First, the method 200 commences at step 205, where an IP camera is installed and an access list is located in a first software platform. The method 200 continues to step 210 where a second software platform account is generated and a second access list is made that includes address of at least user A and other users. The method 200 them continues to step 215 where the first software platform is commenced and the access control application is executed with the sharing system. This can be performed in at least two or more different ways by starting the first software platform through the second software platform or directly within the first software platform which requires user A to login to both the first and the second software platforms using a login and a password.

The method 200 then continues at step 220. The first software platform is now associated with the second software platform. Data may be communicated and shared in a secure manner between the two software platforms as user A has been successfully authenticated in both the first and the second software platform. If a user is denied authentication, no data can be shared other than an additional request for a login and a request for password. After a number of unsuccessful login attempts, the method 200 will end and the system can suspend the account.

Turning now to FIG. 13, there is shown a method 225 showing access control of the network device across at least two independent software platforms. The method 225 commences at step 230, where user A associates a first software platform user account with a second software platform user account as shown in FIG. 12. At step 235, preferably the access list of user A is accessed for mapping along with the applicable network devices that are available, such as for example, an IP camera, or DVR recorder.

At step 235, the method 200 continues where user A can select a second user from an access list associated in the second software platform. For example, user A can select a second user in a FACEBOOK FRIENDS LIST® or in a different access list stored on a social network or the like. This chosen second user may not be a registered first software platform user. Turning now to step 240, user A selects an owned network device or a network device that user A has connected with the data manager 170 of FIG. 11 and that user A can control. Alternatively, the network device may be a device that user A can access from a different independent software platform. Preferably, the network device is one that user A is authorized to access; one that user A can receive data in a safe and secure manner; and one that user A can provide and receive control commands.

Turning now to decision block 255, a decision is reached whereby user A can manage and control the first network device through the first software platform along line 245 to step 250 or can share the first device along line 257 to step 260. At step 260, user A can add a second user from the access list of the second software platform as an authorized user that can view the output from the first network device and that can control the first network device within the second software platform. The second user is associated with the second software platform and may not be associated with the first software platform.

At step 265, the second user while staying in the second software platform can now access the output of the shared device from user A. The second user can control the first device as the network device is displayed as an available device in the second software platform for the second user. At step 270, the second user can select the network device for accessing and control purposes. At step 275, the network device can output video data from the network device through the first software platform to the second software platform to the second user.

Alternatively, the network device in the first software platform can send the data to the second user to view the data in the second software platform. For example, in the case where the first device is a network camera, the second user in the second software platform can view the output of the digital video camera, leave comments on the graphical display associated with the digital video camera, chat with user A while viewing the digital video, or can control the digital video camera to pan, tilt, zoom or perform any other control functions associated with the first digital camera.

Generally, in operation, the computer system operable with that method shown in FIGS. 12-13 is controlled by an operating system. Typical examples of operating systems are MS-DOS and Windows95 from Microsoft Corporation, or Solaris and SunOS from Sun Microsystems, Inc., or the Apple OSX from Apple Corporation. As the computer system operates, input such as input search data, database record data, programs and commands, received from users or other processing systems, are stored on storage device. Certain commands cause the processor to retrieve and execute the stored programs. The programs executing on the processor may obtain more data from the same or a different input device, such as a network connection. The programs may also access data in a database for example, and commands and other input data may cause the processor to index, search and perform other operations on the database in relation to other input data. Data may be generated which is sent to the output device for display to the user or for transmission to another computer system or device. Typical examples of the computer system are personal computers and workstations, hand-held computers, dedicated computers designed for a specific purpose, and large main frame computers suited for use many users. The present invention is not limited to being implemented on any specific type of computer system or data processing device.

It is noted that the present invention may also be implemented in hardware or circuitry which embodies the logic and processing disclosed herein, or alternatively, the present invention may be implemented in software in the form of a computer program stored on a computer readable medium such as a storage device. In the later case, the present invention in the form of computer program logic and executable instructions is read and executed by the processor and instructs the computer system to perform the functionality disclosed as the invention herein. If the present invention is embodied as a computer program, the computer program logic is not limited to being implemented in any specific programming language. For example, commonly used programming languages such as C, C++, JAVA as well as others may be used to implement the logic and functionality of the present invention. Furthermore, the subject matter of the present invention is not limited to currently existing computer processing devices or programming languages, but rather, is meant to be able to be implemented in many different types of environments in both hardware and software.

Furthermore, combinations of embodiments of the invention may be divided into specific functions and implemented on different individual computer processing devices and systems which may be interconnected to communicate and interact with each other. Dividing up the functionality of the invention between several different computers is meant to be covered within the scope of the invention.

While this invention has been particularly shown and described with references to a preferred embodiment thereof, it will be understood by those skilled in the art that is made therein without departing from the spirit and scope of the invention as defined by the following claims.

What is claimed is:

1. A system for sharing a device comprising:
  a first computing device operating on a first software platform for authenticating at least a first user and accessing a first user's access list having at least one address of a second user;
  a second computing device operable with the first user and a second different software platform: and
  mapping a destination across the first and the second software platforms to selectively control the device associated with the first user from the first user's access list with the first user operating on the second computing device with an application programming interface (API) associated with at least one of the first and the second software platforms.

2. A method of controlling a network device operable on a first software platform from a second software platform using an access list associated with the first or the second software platforms, the method comprising:
  providing a system comprising one or more processors, wherein said first software platform is operable on said system;
  accessing the first software platform having a first access list;
  authenticating a first user, using the first access list on the first software platform;
  mapping a path of at least a second user using the first access list in the first software platform by linking the first software platform and the second software platform using an application programming interface of at least one of the first and the second software platform;
  accessing the second software platform and authenticating a second user; and
  providing an output of the network device to the second user through an electronic output device, using at least one of or both the second software platform and the first software platform;
  managing the network device by controlling the network device with the first or the second software platform.

3. The method of claim 2, further comprising mapping the path of at least a third user operating on a third software platform operable on another system comprising one or more processors, wherein said mapping of the path is performed by first access list in the first platform or a second access list in the second software platform by linking the first or the second software platform and the third software platform using the application programming interface of at least one of the first, the second or the third software platform.

* * * * *